United States Patent
Zhang et al.

(10) Patent No.: US 10,193,759 B2
(45) Date of Patent: Jan. 29, 2019

(54) CONTROL METHOD IN COMMUNICATIONS NETWORK CENTRALIZED CONTROLLER, AND WIRELESS COMMUNICATIONS NETWORK SYSTEM

(71) Applicant: Huawei Technologies Co., Ltd., Shenzhen, Guangdong (CN)

(72) Inventors: Wei Zhang, Shanghai (CN); Chenghui Peng, Munich (DE); Wei Tan, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 160 days.

(21) Appl. No.: 15/221,872

(22) Filed: Jul. 28, 2016

(65) Prior Publication Data

US 2016/0337196 A1    Nov. 17, 2016

Related U.S. Application Data

(63) Continuation of application No. PCT/CN2014/071815, filed on Jan. 29, 2014.

(51) Int. Cl.
| | |
|---|---|
| *H04L 12/12* | (2006.01) |
| *H04L 12/755* | (2013.01) |
| *H04L 12/717* | (2013.01) |
| *H04L 12/803* | (2013.01) |
| *H04L 12/813* | (2013.01) |
| *H04L 12/721* | (2013.01) |

(Continued)

(52) U.S. Cl.
CPC ............ *H04L 41/12* (2013.01); *H04L 45/021* (2013.01); *H04L 45/302* (2013.01); *H04L 45/38* (2013.01);

(Continued)

(58) Field of Classification Search
None
See application file for complete search history.

(56) References Cited

U.S. PATENT DOCUMENTS

| | | | |
|---|---|---|---|
| 9,509,549 B2 * | 11/2016 | Pruss | H04L 41/0206 |
| 2013/0246655 A1 * | 9/2013 | Itoh | H04L 45/38 |
| | | | 709/238 |

(Continued)

FOREIGN PATENT DOCUMENTS

| | | |
|---|---|---|
| CN | 101072138 A | 11/2007 |
| CN | 101374341 A | 2/2009 |

(Continued)

OTHER PUBLICATIONS

"OpenFlow Switch Specification, Version 1.4.0 (Wire Protocol 0x05)", Open Networking Foundation, ONF TS-012, Oct. 14, 2013, 206 pages.

*Primary Examiner* — Lonnie V Sweet

(57) ABSTRACT

The present application provides a control method in a communications network, a centralized controller, and a wireless communications network system, where the method includes: generating a to-be-confirmed processing type list according to a service type of a service flow and a data path type template, where the to-be-confirmed processing type list includes all processing function types that may be needed by the service flow; then filtering the to-be-confirmed processing type list, and generating a processing type list, where the processing type list includes processing function types that are essential to the service flow; further, sequentially selecting a working policy and a working parameter for each processing instance, generating a full path policy, and sending the full path policy to an instance of each function node. Therefore, a corresponding service flow path is selected according to a service type corresponding to a different service flow, network resource utilization is improved.

12 Claims, 5 Drawing Sheets

(51) Int. Cl.
*H04L 12/911* (2013.01)
*H04L 29/12* (2006.01)
*H04L 12/24* (2006.01)
*H04L 12/725* (2013.01)

(52) U.S. Cl.
CPC ............ *H04L 45/42* (2013.01); *H04L 47/125* (2013.01); *H04L 47/20* (2013.01); *H04L 47/78* (2013.01); *H04L 47/781* (2013.01); *H04L 61/2007* (2013.01)

(56) References Cited

U.S. PATENT DOCUMENTS

| | | | | |
|---|---|---|---|---|
| 2014/0036673 A1* | 2/2014 | Ehara | ................... | H04L 45/302 370/230.1 |
| 2014/0140344 A1* | 5/2014 | Krishnan et al. | ..... | H04L 12/741 370/392 |
| 2014/0233385 A1* | 9/2014 | Beliveau et al. | ....... | H04L 47/10 370/235 |
| 2015/0009827 A1* | 1/2015 | Kawai | ..................... | H04L 45/54 370/235 |
| 2015/0088827 A1* | 3/2015 | Xu | .................... | G06F 17/30215 707/634 |

FOREIGN PATENT DOCUMENTS

| | | |
|---|---|---|
| CN | 102100112 A | 6/2011 |
| CN | 102904837 A | 1/2013 |
| CN | 102972009 A | 3/2013 |
| JP | 2011166384 A | 8/2011 |
| WO | 2013125342 A | 7/2015 |
| WO | 2013125342 A1 | 7/2015 |

* cited by examiner

CONTROL METHOD IN COMMUNICATIONS NETWORK CENTRALIZED CONTROLLER, AND WIRELESS COMMUNICATIONS NETWORK SYSTEM

CROSS-REFERENCE TO RELATED APPLICATIONS

This application is a continuation of International Application No. PCT/CN2014/071815, filed on Jan. 29, 2014, which is hereby incorporated by reference in its entirety.

TECHNICAL FIELD

The present invention relates to communications technologies, and in particular, to a control method in a communications network, a centralized controller, and a wireless communications network system.

BACKGROUND

With a current prevailing trend of virtualization, in the field of communications technologies, the prior art puts forward a new-type network architecture obtained by arranging a network architecture on a virtual platform. For communications manufacturers, by means of arrangement of a network architecture on a common platform, a development cycle can be shortened and product difficulty can be lowered, thereby reducing development costs. For operators using communications devices, product procurement prices can also be lowered and maintenance costs can be reduced. The network architecture includes network nodes in an existing network: a base station (BS), a multimode base station controller (MBSC), a mobile management entity (MME), a packet data network gateway (PGW)/serving gateway (SGW), a service gateway, a coordinator, a network open interface (eg. a Networker), a virtualized platform, and an IP hardware device. The BTS, the MBSC, the MME, the PGW/SGW, and the service gateway still use an original network architecture. Further, the BTS, the MBSC, the MME, and the PGW/SGW all exist as independent physical entities. The PGW is used as an example. Many data-plane functions, for example, a mobile IP, data packet filtering, GTP tunnel management, security or charging, and the like, are integrated inside the PGW.

However, a function of each network node described above is implemented in a physical box in a tightly coupled manner, and the function of each network node is already permanently configured. Therefore, for a service of a different type, in a network structure provided in the prior art, a path for the service is fixed, leading to a waste of network resources during light-traffic hours and network congestion during heavy-traffic hours.

SUMMARY

Embodiments of the present invention provide a control method in a communications network, a centralized controller, and a wireless communications network system, so as to select a corresponding service flow path according to a service type corresponding to a different service flow.

A first aspect of the present invention provides a control method in a communications network, including:

generating, by a centralized controller in a communications network, a to-be-confirmed processing type list according to a service type of a service flow and a data path type template, where the data path type template includes all processing function types and a selection instruction corresponding to each processing function type, the to-be-confirmed processing type list includes all first processing function types, and the first processing function types are all processing function types that may be needed by the service flow;

filtering, by the centralized controller, the first processing function types according to a selection instruction corresponding to each first processing function type, and generating a processing type list, where the processing type list includes all second processing function types, and the second processing function types are processing function types, essential to the service flow, after filtering;

selecting, by the centralized controller, a corresponding processing instance for each second processing function type, and sequentially selecting a working policy and a working parameter for each processing instance;

generating, by the centralized controller, a full path policy, where the path policy includes all the processing instances that the service flow sequentially flows through and a working policy and a working parameter that correspond to each processing instance; and sending, by the centralized controller, the full path policy to an instance of each function node according to a network topology, where the instance of each function node corresponds to one processing instance, and the network topology includes function types of the instances of all the function nodes, connection relationships between the instances of all the function nodes, and statuses of the instances of all the function nodes.

With reference to the first aspect, in a first possible implementation manner, the filtering, by the centralized controller, the first processing function types according to a selection instruction corresponding to each first processing function type, and generating a processing type list includes:

corresponding to the service type of the service flow, if the selection instruction corresponding to the first processing function type is mandatory, adding, by the centralized controller, the first processing function type to the processing type list; or corresponding to the service type of the service flow, if the selection instruction corresponding to the first processing function type is optional, determining, by the centralized controller, whether an activation parameter corresponding to the first processing function type meets an activation condition, and if the activation parameter corresponding to the first processing function type meets the activation condition, adding, by the centralized controller, the first processing function type to the processing type list.

With reference to the first possible implementation manner of the first aspect, in a second possible implementation manner, the activation parameter corresponding to the first processing function type includes one or any combination of a current network load, a user level, or service QoS information of the service flow; and the determining, by the centralized controller, whether an activation parameter corresponding to the first processing function type meets an activation condition, and if the activation parameter corresponding to the first processing function type meets the activation condition, adding, by the centralized controller, the first processing function type to the processing type list includes:

if the current network load corresponding to the first processing function type is greater than or less than a load threshold, adding, by the centralized controller, the first processing function type to the processing type list; or if the user level corresponding to the first processing function type is lower or higher than a user level threshold, adding, by the centralized controller, the first processing function type to the processing type list; or if the service QoS information of the service flow corresponding to the first processing function type meets or does not meet a QoS requirement, adding, by the centralized controller, the first processing function type to the processing type list.

With reference to the first aspect or any one of the foregoing possible implementation manners of the first aspect, in a third possible implementation manner, the selecting, by the centralized controller, a corresponding processing instance for each second processing function type includes:

each second processing function type corresponds to one processing instance, and each processing instance corresponds to an instance of one function node; selecting, by the centralized controller, the corresponding processing instance for each second processing function type according to a status of the instance of each function node in the network topology and the service QoS information of the service flow.

With reference to the first aspect or any one of the foregoing possible implementation manners of the first aspect, in a fourth possible implementation manner, the sequentially selecting, by the centralized controller, a working policy and a working parameter for each processing instance includes:

each processing instance corresponds to an instance of one function node; selecting, by the centralized controller, the working policy and the working parameter for each processing instance according to the status of the instance of each function node in the network topology and preconfigured policy information, and allocating a transmission bandwidth resource and a calculation processing resource to the service flow.

With reference to the first aspect or any one of the foregoing possible implementation manners of the first aspect, in a fifth possible implementation manner, before the generating, by a centralized controller, a to-be-confirmed processing type list according to a service type of a service flow and a data path type template, the method further includes:

determining, by the centralized controller according to the network topology and a mapping relationship between a user IP address of the service flow and a radio node, the radio node corresponding to the service flow; or determining, by the centralized controller, a last hop of the instances of the function nodes according to the network topology and a mapping relationship between a user IP address of the service flow and a radio node.

A second aspect of the present invention provides a centralized controller, including:

a list generation module, configured to generate a to-be-confirmed processing type list according to a service type of a service flow and a data path type template, where the data path type template includes all processing function types and a selection instruction corresponding to each processing function type, the to-be-confirmed processing type list includes all first processing function types, and the first processing function types are all processing function types that may be needed by the service flow; and further configured to filter the first processing function types according to a selection instruction corresponding to each first processing function type, and generate a processing type list, where the processing type list includes all second processing function types, and the second processing function types are processing function types, essential to the service flow, after filtering;

a selection module, configured to select a corresponding processing instance for each second processing function type, and sequentially select a working policy and a working parameter for each processing instance;

a policy generation module, configured to generate a full path policy, where the path policy includes all the processing instances that the service flow sequentially flows through and a working policy and a working parameter that correspond to each processing instance; and a sending module, configured to send the full path policy to an instance of each function node according to a network topology, where the instance of each function node corresponds to one processing instance, and the network topology includes function types of the instances of all the function nodes, connection relationships between the instances of all the function nodes, and statuses of the instances of all the function nodes.

With reference to the second aspect, in a first possible implementation manner, the list generation module is specifically configured to: if the selection instruction corresponding to the first processing function type is mandatory, add the first processing function type to the processing type list; or is specifically configured to: if the selection instruction corresponding to the first processing function type is optional, determine whether an activation parameter corresponding to the first processing function type meets an activation condition, and if the activation parameter corresponding to the first processing function type meets the activation condition, add the first processing function type to the processing type list.

With reference to the first possible implementation manner of the second aspect, in a second possible implementation manner, the activation parameter corresponding to the first processing function type includes one or any combination of a current network load, a user level, or service QoS information of the service flow; and the list generation module is specifically configured to: if the current network load corresponding to the first processing function type is greater than or less than a load threshold, add the first processing function type to the processing type list; or is specifically configured to: if the user level corresponding to the first processing function type is lower or higher than a user level threshold, add the first processing function type to the processing type list; or is specifically configured to: if the service QoS information corresponding to the first processing function type meets or does not meet a QoS requirement, add the first processing function type to the processing type list.

With reference to the second aspect or any one of the foregoing possible implementation manners of the second aspect, in a third possible implementation manner, the selection module is specifically configured to select the corresponding processing instance for each second processing function type according to a status of the instance of each function node in the network topology and the service QoS information of the service flow, where each second processing function type corresponds to one processing instance, and each processing instance corresponds to an instance of one function node.

With reference to the second aspect or any one of the foregoing possible implementation manners of the second aspect, in a fourth possible implementation manner, the selection module is further specifically configured to select the working policy and the working parameter for each processing instance according to the status of the instance of each function node in the network topology and preconfigured policy information, and allocate a transmission bandwidth resource and a calculation processing resource to the service flow, where each processing instance corresponds to an instance of one function node.

With reference to the second aspect or any one of the foregoing possible implementation manners of the second aspect, in a fifth possible implementation manner, the centralized controller further includes:

a determining module, configured to determine, before the to-be-confirmed processing type list is generated according to the service type of the service flow and the data path type template, according to the network topology and a mapping relationship between a user IP address of the service flow and a radio node, the radio node corresponding to the service flow; or configured to determine a last hop of the instances of the function nodes according to the network topology and a mapping relationship between a user IP address of the service flow and a radio node.

A third aspect of the present invention provides a wireless communications network system, including: the centralized controller according to the second aspect or any one of the foregoing possible implementation manners of the second aspect, a network address translator, at least one distributor, at least one ingress node, at least one function node, and at least one radio node, where the network address translator is configured to convert an address of a service flow, so as to ensure transmission of the service flow between an access network and an external data network;

the distributor is configured to distribute data of the service flow to the at least one ingress node;

the ingress node is configured to perform data rule matching on the data of the service flow and label the data of the service flow, so that the function node on a service path may establish, according to the label marked on the ingress node, a direct index to a processing instance for processing;

the function node is configured to process the data of the service flow by using a corresponding processing instance according to a service type of the service flow; and the radio node is configured to receive or send the data of the service flow.

According to the control method in a communications network, the centralized controller, and the wireless communications network system provided in the embodiments, a to-be-confirmed processing type list is generated according to a service type of a service flow and a data path type template, where the data path type template includes all processing function types and a selection instruction corresponding to each processing function type, the to-be-confirmed processing type list includes all first processing function types, and the first processing function types are processing function types that may be needed by the service flow. The first processing function types are then filtered according to a selection instruction corresponding to each first processing function type, and a processing type list is generated, where the processing type list includes all second processing function types, and the second processing function types are processing function types, essential to the service flow, after filtering. Further, a corresponding processing instance is selected for each second processing function type, a working policy and a working parameter are sequentially selected for each processing instance, and a full path policy is generated, where the path policy includes all the processing instances that the service flow sequentially flows through and a working policy and a working parameter that correspond to each processing instance; and the full path policy is sent to an instance of each function node according to a network topology, so that the instance of each function node processes the service flow according to the full path policy, thereby selecting a corresponding service flow path according to a service type corresponding to a different service flow, balancing a network load, and improving network resource utilization.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show some embodiments of the present invention, and a person of ordinary skill in the art may still derive other drawings from these accompanying drawings without creative efforts.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
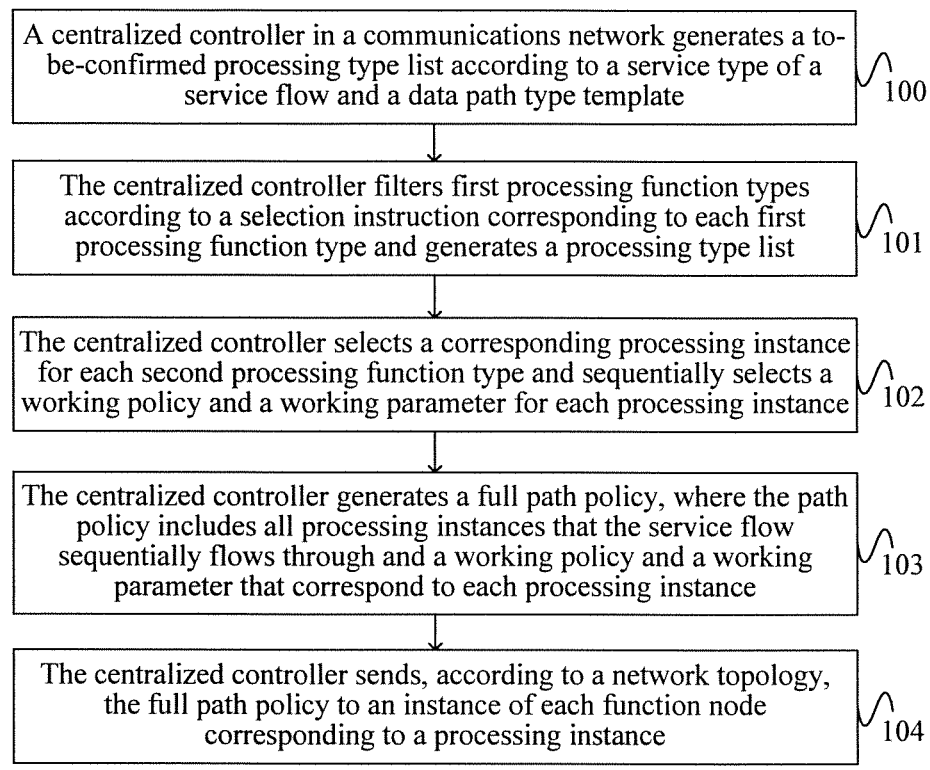
FIG. 1 is a schematic flowchart of a control method in a communications network according to an embodiment of the present invention.

FIG. 1 is a schematic flowchart of a control method in a communications network according to an embodiment of the present invention. The control method is performed by a centralized controller. The centralized controller has two aspects of functions. Signaling-plane centralized processing: Processing of user-related signaling (for example, user access authentication, mobility, or bearer management) and interaction signaling between network elements (for example, network status information updating or network topology maintenance). User-plane centralized control: A data-plane processing rule, which includes a processing path, a processing policy or parameter, and the like, for user data is determined according to obtained signaling-plane information, and the processing rule is transferred to a data-plane function node. Moreover, a service path decision for a service flow is preconfigured on the centralized controller. When the service flow flows through an access network, in consideration of a network status, a user status, a service requirement, and the like, the centralized controller is responsible for coordinating and planning a data path of each data flow between instances of different function nodes in the access network from a perspective of an entire network, and processing instances and corresponding parameters on the instances of the function nodes, so as to maximize network resource utilization. Specifically, when a user initiates a new service and a new service flow needs to be transmitted, the centralized controller needs to determine a processing path for the current service flow. A method for determining the service path includes the following steps:

Step 100: A centralized controller in a communications network generates a to-be-confirmed processing type list according to a service type of a service flow and a data path type template.

Specifically, a data path type template includes all processing function types and a selection instruction corresponding to each processing function type, and a to-be-confirmed processing type list includes all first processing function types, where the first processing function types are processing function types that may be needed by a service flow, and when the first processing function types are optional, the first processing function types correspond to an activation condition.

Step 101: The centralized controller filters first processing function types according to a selection instruction corresponding to each first processing function type and generates a processing type list.

Specifically, the processing type list includes all second processing function types, and the second processing function types are processing function types, essential to the service flow, after filtering.

Step 102: The centralized controller selects a corresponding processing instance for each second processing function type and sequentially selects a working policy and a working parameter for each processing instance.

Step 103: The centralized controller generates a full path policy, where the path policy includes all processing instances that the service flow sequentially flows through and a working policy and a working parameter that correspond to each processing instance.

Step 104: The centralized controller sends, according to a network topology, the full path policy to an instance of each function node corresponding to a processing instance.

Specifically, because an instance of each function node corresponds to one processing instance. A network topology includes function types of the instances of all function nodes, connection relationships between the instances of all the function nodes (a bandwidth, a transmission delay, and/or the like), and statuses of the instances of all the function nodes. A status of an instance of a function node includes one or any combination of a load of the instance of the function node, a bandwidth of the instance of the function node, or a processing capability of the instance of the function node, for example, a quantity of bits processed per second and a mapping relationship between a user IP address and a radio node.

According to the method for determining a service path provided in this embodiment, a centralized controller in a communications network generates a to-be-confirmed processing type list according to a service type of a service flow and a data path type template, where the data path type template includes all processing function types and a selection instruction corresponding to each processing function type, the to-be-confirmed processing type list includes all first processing function types, and the first processing function types are processing function type that may be needed by the service flow. The centralized controller then filters the first processing function types according to a selection instruction corresponding to each first processing function type and generates a processing type list, where the processing type list includes all second processing function types, and the second processing function types are processing function types, essential to the service flow, after filtering. Further, the centralized controller selects a corresponding processing instance for each second processing function type and sequentially selects a working policy and a working parameter for each processing instance, and the centralized controller generates a full path policy, where the path policy includes all processing instances that the service flow sequentially flows through and a working policy and a working parameter that correspond to each processing instance. The centralized controller sends the full path policy to an instance of each function node according to a network topology, so that the instance of each function node processes the service flow according to the full path policy, thereby selecting a corresponding service flow path according to a service type corresponding to a different service flow, balancing a network load, and improving network resource utilization.

It should be noted that, the network topology, the data path type template, processing function types of instances of different function nodes, and a preset processing parameter are preconfigured for the centralized controller in this embodiment.

The data path type template includes the following information: a processing function type that the service flow flows through, optional and mandatory instructions, an activation condition when optional, a policy set, a trigger condition for an optional processing policy, and a processing parameter set corresponding to a policy; and the processing policy types of the instances of different function nodes and the preset processing parameter, for example, different working modes: UM/AM in which a radio node processes a RLC-layer function.

Specifically, the foregoing information preconfigured for the centralized controller may be embodied in a centralized representation manner or implemented in a hierarchical representation manner. Referring to Table 1 and Table 2 below, Table 1 is a schematic table of the centralized representation manner, and Table 2 is a schematic table in the hierarchical representation manner.

TABLE 1

| Service type 1 | Processing function type 1, mandatory Policy set [optional processing policy 1{trigger condition (network status, user status, and service information), policy parameter set}; optional processing policy | Processing function type 2, optional Activation condition (network status, user status, and service information) Policy set [optional processing policy 1{activation condition (network status, user status, and service information), |

TABLE 1-continued

| 2{activation condition (network status, user status, and service information), policy parameter set}] | policy parameter set}; optional processing policy 2{activation condition (network status, user status, and service information), policy parameter set}] |
|---|---|

TABLE 2 layer 1

| Service type 1 | Processing function type 1, mandatory | Processing function type 2, optional Activation condition (network status, user status, and service information) |
|---|---|---|
| Service type 2 | Processing function type 1, mandatory | Function type 3, optional Activation condition (network status, user status, and service information) |

TABLE 2 layer 1

| Processing function type 1 | Policy set [optional processing policy 1{trigger condition (network status, user status, and service information), policy parameter set}; optional processing policy 2 {activation condition (network status, user status, and service information), policy parameter set}] |
|---|---|
| Processing function type 2 | Policy set [optional processing policy 1{trigger condition (network status, user status, and service information), policy parameter set}; optional processing policy 2 {activation condition (network status, user status, and service information], policy parameter set}] |

Further, step 101 in FIG. 1 may be implemented in two possible implementation manners:

Manner 1: Corresponding to the service type of the service flow, if the selection instruction corresponding to the first processing function type is mandatory, the centralized controller adds the first processing function type to the processing type list.

Manner 2: Corresponding to the service type of the service flow, if the selection instruction corresponding to the first processing function type is optional, the centralized controller determines whether an activation parameter corresponding to the first processing function type meets an activation condition, and if the activation parameter corresponding to the first processing function type meets the activation condition, the centralized controller adds the first processing function type to the processing type list.

Figure 2:
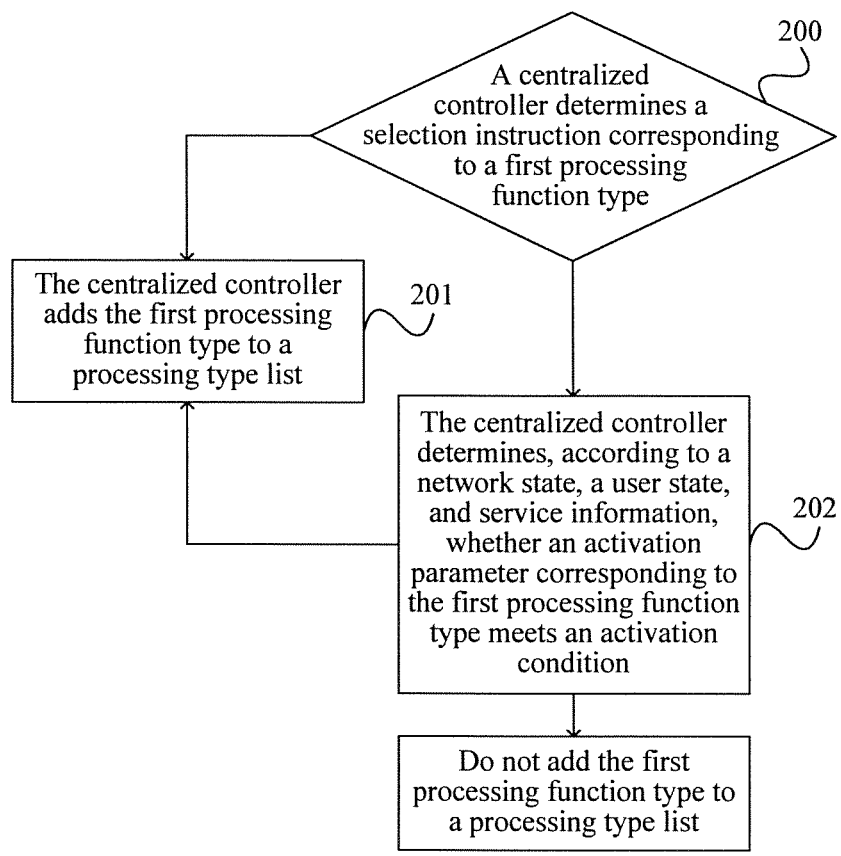
FIG. 2 is a schematic flowchart of selection of a processing function type according to an embodiment of the present invention.

FIG. 2 is a schematic flowchart of selection of a processing function type according to an embodiment of the present invention. As shown in FIG. 2, descriptions of processes in which Manner 1 or Manner 2 is selected include the following steps:

Step 200: A centralized controller determines a selection instruction corresponding to a first processing function type.

Specifically, if the selection instruction corresponding to the first processing function type is mandatory, step 201 is performed; or if the selection instruction corresponding to the first processing function type is optional, step 202 is performed.

Step 201: The centralized controller adds the first processing function type to a processing type list.

Step 202: The centralized controller determines, according to a network status, a user status, and service information, whether an activation parameter corresponding to the first processing function type meets an activation condition.

Specifically, if the activation parameter corresponding to the first processing function type meets the activation condition, step 201 is performed; or if the activation parameter corresponding to the first processing function type does not meet the activation condition, the first processing function type is not added to the processing type list.

It should be noted that, as shown in Table 1 and Table 2, one service flow may need multiple processing function types, and therefore, in this embodiment, a process of selecting a processing function type is sequentially filtering each first processing function type, and subsequently selecting a next first processing function type after one first processing function type is selected. The foregoing steps 200 to 202 are repeated.

Further, factors that are taken into consideration to determine the service path in the foregoing are mainly: the network status, the user status, and the service information. Therefore, the activation parameter corresponding to the first processing function type in Manner 2 includes one or any combination of a current network load, a user level, or service quality of service (QoS) information of the service flow.

Manner 2 for the step: "the centralized controller determines whether an activation parameter corresponding to the first processing function type meets an activation condition, and if the activation parameter corresponding to the first processing function type meets the activation condition, the centralized controller adds the first processing function type to the processing type list" includes any one or a combination of the following implementation manners:

Manner a: If the current network load corresponding to the first processing function type is greater than or less than a load threshold, the centralized controller adds the first processing function type to the processing type list.

According to different processing functions, the activation condition may be set to be "being greater than a load threshold", or may be set to be "being less than a load threshold". Moreover, an option of "being equal to" may be included in a manner of "being greater than" or a manner of "being less than", which is not limited herein.

Manner b: If the user level corresponding to the first processing function type is lower or higher than a user level threshold, the centralized controller adds the first processing function type to the processing type list.

According to different processing functions, the activation condition may be set to be "being lower than a user level threshold", or may be set to be "being greater than a user level threshold". Moreover, an option of "being equal to" may be included in a manner of "being greater than" or a manner of "being less than", which is not limited herein.

Manner c: If the service QoS information corresponding to the first processing function type meets or does not meet a QoS requirement, the centralized controller adds the first processing function type to the processing type list.

According to different processing functions, the activation condition may be set to be "meeting a QoS requirement", or may be set to be "not meeting a QoS requirement". Moreover, an option of "being equal to" may be included in a manner of "being greater than" or a manner of "being less than", which is not limited herein.

For example, the three manners are combined. In a video service, if the first processing function type corresponds to video content compression; and when the current network load is greater than a load threshold, when the user level is lower than a user level threshold, and in a case in which the QoS requirement is met, content compression processing is performed on video service data, so as to save transmission resources of an entire network and serve more users. Therefore, the first processing function type for the video content compression may be added, as a second processing function type, to the processing type list.

Preferably, a feasible implementation manner of "selecting, by the centralized controller, a corresponding processing instance for each second processing function type" in step 102 in FIG. 1 is as follows:

Because each second processing function type corresponds to one processing instance, and each processing instance corresponds to an instance of one function node, the centralized controller selects the corresponding processing instance for each second processing function type according to a status of the instance of each function node in the network topology and the service QoS information of the service flow.

Specifically, each function processing type corresponds to multiple processing instances; however, for each service flow, according to different service flow types, after the centralized controller determines a mandatory second processing function type for the service flow, the second processing function type can correspond to only one processing instance. In addition, because each processing instance corresponds to an instance of one function node, a processing instance is selected with reference to the service QoS requirement according to the processing type list and the status of the instance of each function node in the network topology. The status of the instance of the function node includes one or any combination of a load of the instance of the function node, a bandwidth of the instance of the function node, or a processing capability of the instance of the function node. For example, for one type of service flow, after all second processing function types needing to be used are determined, in consideration of a network topology (which includes information such as a bandwidth between nodes and a transmission delay) from an ingress node to a last radio node and distribution of an instance corresponding to each of the needed second processing function types in the network topology and a load situation of each instance, a processing instance corresponding to each second processing function type is selected.

Preferably, one feasible implementation manner of "sequentially selecting a working policy and a working parameter for each processing instance" in step 102 in FIG. 1 is as follows:

the centralized controller selects the working policy and the working parameter for each processing instance according to the status of the instance of each function node in the network topology and preconfigured policy information, and allocates a transmission bandwidth resource and a calculation processing resource to the service flow.

Specifically, the status of the instance of the function node includes a load of the instance of the function node, a bandwidth of the instance of the function node, and a processing capability of the instance of the function node. Moreover, each processing instance corresponds to an instance of one function node.

Figure 3:
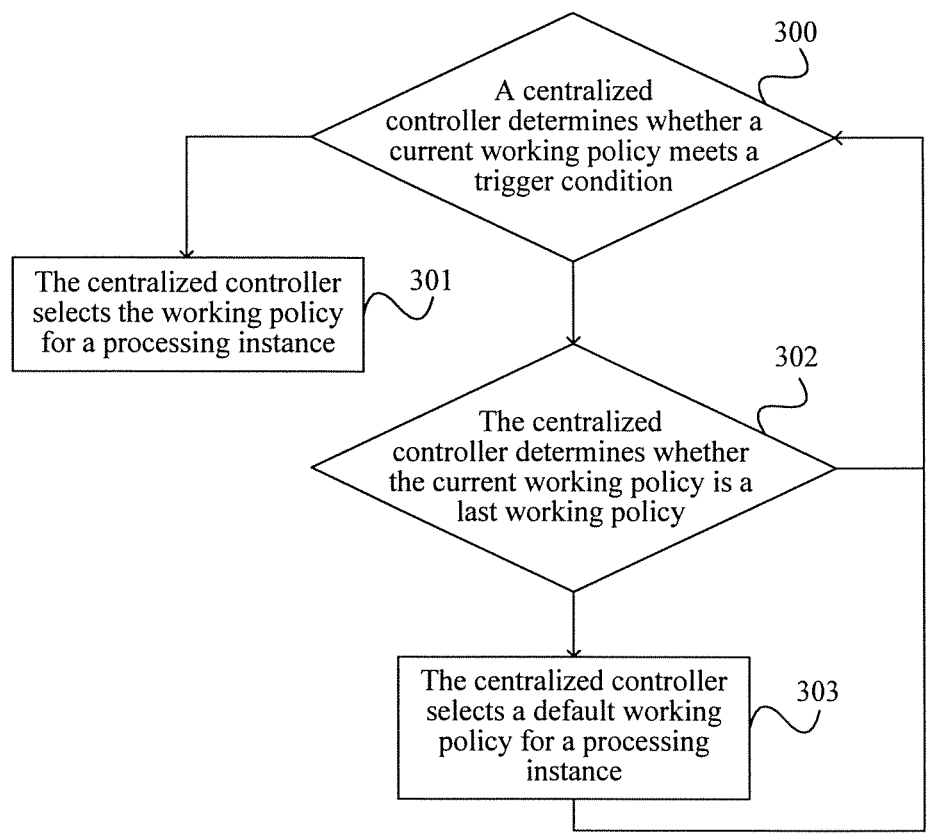
FIG. 3 is a schematic flowchart of selecting a working policy and a working parameter for each processing instance according to an embodiment of the present invention.

FIG. 3 is a schematic flowchart of selecting a working policy and a working parameter for each processing instance according to an embodiment of the present invention. As shown in FIG. 3, the process includes the following steps:

Step 300: A centralized controller determines whether a current working policy meets a trigger condition.

Specifically, if the current working policy meets the trigger condition, step 301 is performed; or if the current working policy does not meet the trigger condition, step 302 is performed.

Specifically, the trigger condition includes three factors: a network status, a user status, and service information.

Step 301: The centralized controller selects the working policy for a processing instance.

Step 302: The centralized controller determines whether the current working policy is a last working policy.

Specifically, because each processing instance may correspond to multiple working policies, if the current working policy is not a last working policy corresponding to the processing instance, the process returns to step 300 to determine a next working policy; or if the current working policy is a last working policy, step 303 is performed.

Step 303: The centralized controller selects a default working policy for the processing instance.

Specifically, the centralized controller presets a default working policy for each processing instance. If there is no working policy to match the processing instance, a default working policy is selected for the processing instance, and then the process returns to step 300 to select a working policy for a next hop of processing instance.

Preferably, a radio node refers to a radio node having a radio frequency function may exist in a remote radio frequency manner, or may be an entire base station. Therefore, before step 100 in FIG. 1, the method further includes:

when the radio node in a network is the entire base station, determining, by the centralized controller according to the network topology and a mapping relationship between a user IP address of the service flow and the radio node, the radio node corresponding to the service flow; or when the radio node in the network is an antenna, determining, by the centralized controller, a last hop of the instances of the function nodes according to the network topology and a mapping relationship between a user IP address of the service flow and the radio node.

Figure 4:
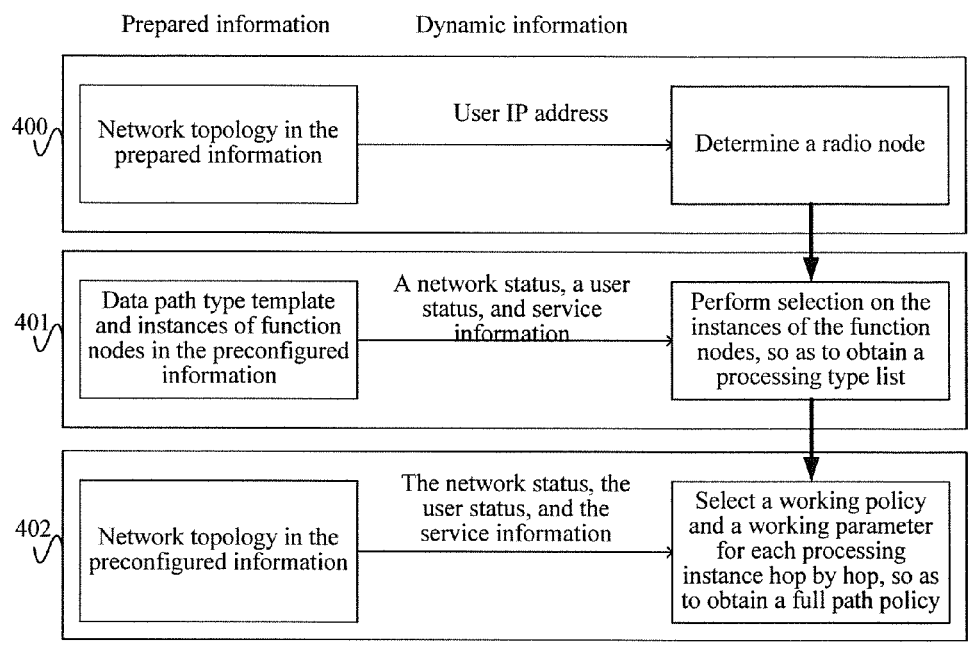
FIG. 4 is a schematic flowchart of another control method in a communications network according to an embodiment of the present invention.

It can be known from the foregoing embodiment that, in a process of determining a service path, the centralized controller determines a service path mainly with reference to preconfigured information and dynamic information, where the preconfigured information mainly includes the foregoing network topology, the data path type template, and the processing function types of the instances of different function nodes, and the preset processing parameter, and the dynamic information mainly refers to related information corresponding to each service flow, for example, one or any combination of a type of a service flow, a user IP address, a network status, a user status, or service information. FIG. 4 is a schematic flowchart of another control method in a communications network according to an embodiment of the present invention. With reference to FIG. 4, the following describes the method for determining a service path from a perspective of using preconfigured information and dynamic information. Referring to FIG. 4, the method includes the following steps:

Step 400: A centralized controller determines a radio node according to a network topology in preconfigured information and a user IP address in dynamic information.

Specifically, a base station to which a user belongs may be determined according to a user IP address, thereby determining a radio node.

Step 401: The centralized controller performs selection on instances of function nodes according to a data path type template and the instances of the function nodes in the preconfigured information and with reference to a network status, a user status, and service information, so as to obtain a processing type list.

Step 402: The centralized controller selects a working policy and a working parameter for each processing instance hop by hop according to the network topology in the preconfigured information and with reference to the network status, the user status, and the service information, so as to obtain a full path policy.

Figure 5:
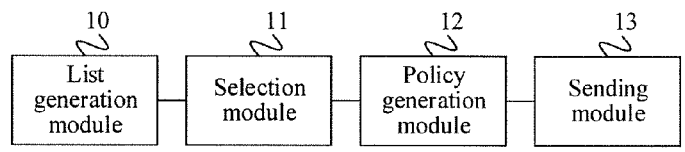
FIG. 5 is a schematic structural diagram of a centralized controller according to an embodiment of the present invention.

FIG. 5 is a schematic structural diagram of a centralized controller according to an embodiment of the present invention. An apparatus for determining a service path is specifically a centralized controller. The centralized controller has two aspects of functions. Signaling-plane centralized processing: Processing of user-related signaling (for example, user access authentication, mobility, or bearer management) and interaction signaling between network elements (for example, network status information updating or network topology maintenance). User-plane centralized control: A data-plane processing rule, which includes a processing path, a processing policy or parameter, and the like, for user data is determined according to obtained signaling-plane information, and the processing rule is transferred to a data-plane function node. Moreover, a service path decision for a service flow is preconfigured on the centralized controller. When the service flow flows through an access network, in consideration of a network status, a user status, a service requirement, and the like, the centralized controller is responsible for coordinating and planning a data path of each data flow between instances of different function nodes in the access network from a perspective of an entire network, and processing instances and corresponding parameters on the instances of the function nodes, so as to achieve a purpose of maximizing network resource utilization. Specifically, when a user initiates a new service and a new service flow needs to be transmitted, the centralized controller needs to determine a processing path for the current service flow. As shown in FIG. 5, the centralized controller includes a list generation module 10, a selection module 11, a policy generation module 12, and a sending module 13.

The list generation module 10 is configured to generate a to-be-confirmed processing type list according to a service type of a service flow and a data path type template, where the data path type template includes all processing function types and a selection instruction corresponding to each processing function type, the to-be-confirmed processing type list includes all first processing function types, and the first processing function types are processing function types that may be needed by the service flow.

The list generation module 10 is further configured to filter the first processing function types according to a selection instruction corresponding to each first processing function type, and generate a processing type list, where the processing type list includes all second processing function types, and the second processing function types are processing function types, essential to the service flow, after filtering.

The selection module 11 is configured to select a corresponding processing instance for each second processing function type, and sequentially select a working policy and a working parameter for each processing instance.

The policy generation module 12 is configured to generate a full path policy, where the path policy includes all the processing instances that the service flow sequentially flows through and a working policy and a working parameter that correspond to each processing instance.

The sending module 13 is configured to send the full path policy to an instance of each function node according to a network topology, where the instance of each function node corresponds to one processing instance, and the network topology includes function types of the instances of all the function nodes, connection relationships between the instances of all the function nodes, and statuses of the instances of all the function nodes.

According to the centralized controller provided in this embodiment, the list generation module generates a to-be-confirmed processing type list according to a service type of a service flow and a data path type template, where the data path type template includes all processing function types and a selection instruction corresponding to each processing function type, the to-be-confirmed processing type list includes all first processing function types, and the first processing function types are processing function types that may be needed by the service flow. The list generation module then filters the first processing function types according to a selection instruction corresponding to each first processing function type, and generates a processing type list, where the processing type list includes all second processing function types, and the second processing function types are processing function types, essential to the service flow, after filtering. Further, the selection module selects a corresponding processing instance for each second processing function type, and sequentially selects a working policy and a working parameter for each processing instance; the policy generation module generates a full path policy, where the path policy includes all the processing instances that the service flow sequentially flows through and a working policy and a working parameter that correspond to each processing instance; and the sending module sends the full path policy to an instance of each function node according to a network topology, so that the instance of each function node processes the service flow according to the full path policy, thereby selecting a corresponding service flow path according to a service type corresponding to a different service flow, balancing a network load, and improving network resource utilization.

Further, the list generation module 10 is specifically configured to: if the selection instruction corresponding to the first processing function type is mandatory, add the first processing function type to the processing type list; or is specifically configured to: if the selection instruction corresponding to the first processing function type is optional, determine whether an activation parameter corresponding to the first processing function type meets an activation condition, and if the activation parameter corresponding to the first processing function type meets the activation condition, add the first processing function type to the processing type list.

Further, the activation parameter corresponding to the first processing function type includes one or any combination of a current network load, a user level, or service quality of service (QoS) information of the service flow.

The list generation module 10 is specifically configured to: if the current network load corresponding to the first processing function type is greater than or less than a load threshold, add the first processing function type to the processing type list; or is specifically configured to: if the user level corresponding to the first processing function type is lower or higher than a user level threshold, add the first processing function type to the processing type list; or is specifically configured to: if the service QoS information corresponding to the first processing function type meets or does not meet a QoS requirement, add the first processing function type to the processing type list.

Further, the selection module 11 is specifically configured to select the corresponding processing instance for each second processing function type according to a status of the instance of each function node in the network topology and the service QoS information of the service flow, where each second processing function type corresponds to one processing instance, and each processing instance corresponds to an instance of one function node.

Further, the selection module 11 is further specifically configured to select the working policy and the working parameter for each processing instance according to the status of the instance of each function node in the network topology and preconfigured policy information, and allocate a transmission bandwidth resource and a calculation processing resource to the service flow, where each processing instance corresponds to an instance of one function node.

Figure 6:
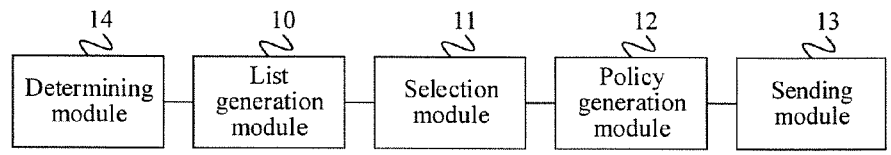
FIG. 6 is a schematic structural diagram of another centralized controller according to an embodiment of the present invention.

FIG. 6 is a schematic structural diagram of another centralized controller according to an embodiment of the present invention. An apparatus for determining a service path is specifically a centralized controller. The apparatus for determining a service path further includes a determining module 14.

The determining module 14 is configured to determine, before the to-be-confirmed processing type list is generated according to the service type of the service flow and the data path type template, according to the network topology and a mapping relationship between a user IP address of the service flow and a radio node, the radio node corresponding to the service flow; or configured to determine a last hop of the instances of the function nodes according to the network topology and a mapping relationship between a user IP address of the service flow and a radio node.

Figure 7:
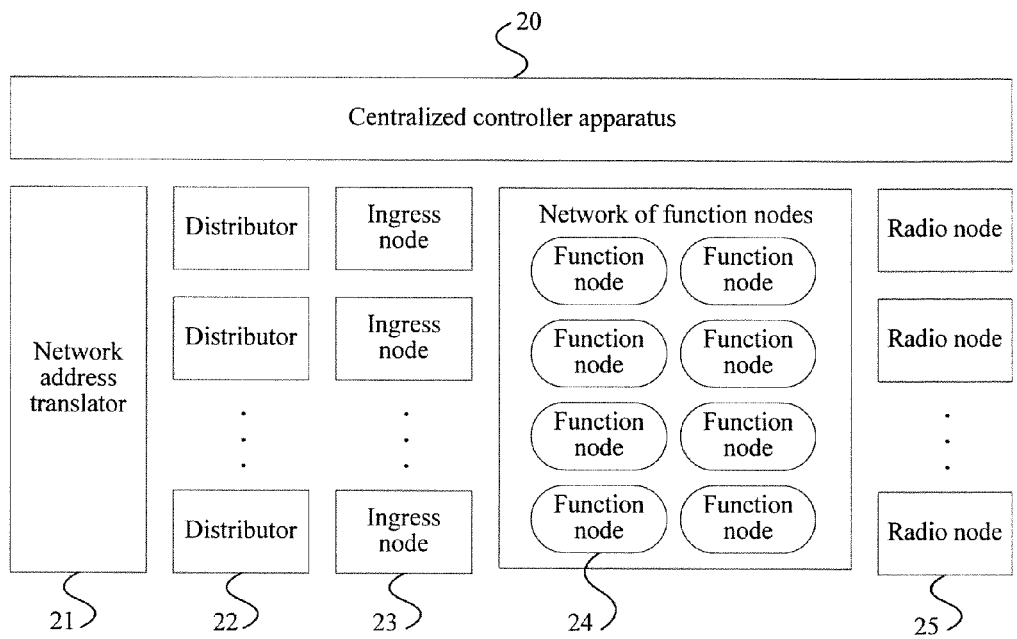
FIG. 7 is a schematic structural diagram of a wireless communications network system according to an embodiment of the present invention.

FIG. 7 is a schematic structural diagram of a wireless communications network system according to an embodiment of the present invention. Referring to FIG. 7, the network system includes the centralized controller (Single Network Controller) apparatus 20 according to any one of the foregoing embodiments, a network address translator 21 NAT), at least one distributor 22, at least one ingress node 23, at least one function node 24, and at least one radio node 25. The functional entities may be implemented on a dedicated physical entity, or may be deployed on a commodity hardware device in a form of a virtual machine. The network system separates, from an original physical device, functions that are from a packet data gateway (PDN GW) to a base station inside an existing network, and the functions are independently deployed in a network of function nodes 24 (Function Nodes Network) according to a function granularity. Possible specific function types are: resolution of a physical-layer processing function, resolution of a Layer 2 function, resolution of a Layer 3 function, video optimization, cross-layer optimization, cache, deep packet inspection DPI), and the like.

The centralized controller 20 has two aspects of functions. Signaling-plane centralized processing: Processing of user-related signaling (for example, user access authentication, mobility, or bearer management) and interaction signaling between network elements (for example, network status information updating or network topology maintenance). User-plane centralized control: A data-plane processing rule, which includes a processing path, a processing policy or parameter, and the like, for user data is determined according to obtained signaling-plane information, and the processing rule is transferred to a data-plane function node 24. Moreover, a service path decision for a service flow is preconfigured on the centralized controller 20. When the service flow flows through an access network, in consideration of a network status, a user status, a service requirement, and the like, the centralized controller 20 is responsible for coordinating and planning a data path of each data flow between instances of different function nodes 24 in the access network from a perspective of an entire network, and processing instances and corresponding parameters on the instances of the function nodes 24, so as to achieve a purpose of maximizing network resource utilization.

The network address translator 21 is configured to convert an address of a service flow, so as to ensure transmission of the service flow between an access network and an external data network.

Specifically, the network address translator 21 is essentially a uniform interface between the access network and the external data network and an inevitable route for upstream and downstream data, and has no direct relationship with an NAT operation.

The distributor 22 is configured to distribute data of the service flow to at least one ingress node 23.

Specifically, considering that there are multiple ingress nodes 23, at least one distributor 22 is introduced herein, and is responsible for distributing received downlink data to the multiple ingress nodes 23. A policy of the distributor 22 may be set by default, or may be delivered by the centralized controller 20.

The ingress node 23 is configured to perform data rule matching on the data of the service flow and label the data of the service flow, so that the function node 24 on a service path may establish, according to the label marked on the ingress node 23, a direct index to a processing instance for processing.

Specifically, to reduce a working amount of the data rule matching, function design of the ingress node 23 is introduced herein. A core function of the ingress node 23 is to perform data rule matching, and perform marking in a label manner. Subsequently, the processing function node 24 on the data path may establish a direct index to a processing policy, determine a next hop of route, or perform another operation according to the label marked on the ingress node 23.

The function node 24 is configured to process the data of the service flow according to a service type of the service flow and by using a corresponding processing instance.

Specifically, herein the network system in this embodiment is essentially different from an IP transmission network in the prior art: all functions of devices in the IP transmission network perform same data forwarding, and therefore, different devices are the same in nature, while in the network system in the present invention, functions provided by the function node 24 not only include data forwarding of a router/switch, but also include many functions of data processing. In addition, the function node 24 is limited by a processing capability (computation and storage), a bandwidth, and the like. For processing of a data flow by the function node 24, processing instances may be the same, or processing instances may be different. The different processing instances need to be preconfigured by the centralized controller 20 or delivered by the centralized controller 20 one by one. For a preconfiguration manner, several processing instances are preconfigured for the function node 24. When the data of the service flow flows through the ingress node 23 for processing, the ingress node 23 needs to add a processing instance indication of each function node 24 to a data packet header, and the function node 24 is indexed to a processing instance for data processing according to the processing instance indication. For a delivering manner, if the data flow has a particular processing instance and parameter in a step of function processing, the centralized controller 20 delivers the processing instance and parameter to the function node 24 in a process in which the data flow is established, and simultaneously instruct the function node 24 to use the processing instance and parameter for the data flow. The function node 24 mentioned herein includes a method for processing a data flow, for example, a compression manner or a compression algorithm during compression of a video, and further includes a data processing priority. The processing parameter includes a specific parameter when a processing manner is used.

The radio node 25 is configured to receive or send the data of the service flow.

Specifically, the radio node 25 having a radio frequency function may be a remote radio frequency device, or may be an entire base station.

According to the wireless communications network system provided in this embodiment, the distributor distributes data of a service flow to at least one ingress node, the ingress node performs data rule matching on the data of the service flow and labels the data of the service flow, and the function node may establish, according to the label marked on the ingress node, a direct index to a corresponding processing instance in a full path policy for processing, where the centralized controller makes different full path policies according to service flows of different service types, and delivers the full path policies to function nodes, so that an entire network system selects a corresponding service flow path according to a different type of service flow, thereby balancing a network load and improving network resource utilization.

Figure 8:
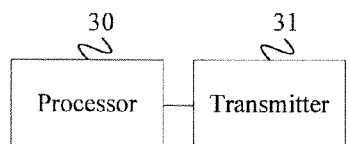
FIG. 8 is a schematic structural diagram of a centralized controller according to an embodiment of the present invention.

FIG. 8 is a schematic structural diagram of a centralized controller according to an embodiment of the present invention. An apparatus for determining a service path is specifically a centralized controller. The centralized controller has two aspects of functions. Signaling-plane centralized processing: Processing of user-related signaling (for example, user access authentication, mobility, or bearer management) and interaction signaling between network elements (for example, network status information updating or network topology maintenance). User-plane centralized control: A data-plane processing rule, which includes a processing path, a processing policy or parameter, and the like, for user data is determined according to obtained signaling-plane information, and the processing rule is transferred to a data-plane function node. Moreover, a service path decision for a service flow is preconfigured on the centralized controller. When the service flow flows through an access network, in consideration of a network status, a user status, a service requirement, and the like, the centralized controller is responsible for coordinating and planning a data path of each data flow between instances of different function nodes in the access network from a perspective of an entire network, and processing instances and corresponding parameters on the instances of the function nodes, so as to achieve a purpose of maximizing network resource utilization. Specifically, when a user initiates a new service and a new service flow needs to be transmitted, the centralized controller needs to determine a processing path for the current service flow. As shown in FIG. 8, the centralized controller includes a processor 30 and a transmitter 31.

The processor 30 is configured to generate a to-be-confirmed processing type list according to a service type of a service flow and a data path type template, where the data path type template includes all processing function types and a selection instruction corresponding to each processing function type, the to-be-confirmed processing type list includes all first processing function types, and the first processing function types are processing function types that may be needed by the service flow.

The processor 30 is further configured to filter the first processing function types according to a selection instruction corresponding to each first processing function type, and generate a processing type list, where the processing type list includes all second processing function types, and the second processing function types are processing function types, essential to the service flow, after filtering.

The processor 30 is further configured to select a corresponding processing instance for each second processing function type, and sequentially select a working policy and a working parameter for each processing instance.

The processor 30 is further configured to generate a full path policy, where the path policy includes all the processing instances that the service flow sequentially flows through and a working policy and a working parameter that correspond to each processing instance.

The transmitter 31 is configured to send the full path policy to an instance of each function node according to a network topology, where the instance of each function node corresponds to one processing instance, and the network topology includes function types of the instances of all the function nodes, connection relationships between the instances of all the function nodes, and statuses of the instances of all the function nodes.

According to the centralized controller provided in this embodiment, the processor generates a to-be-confirmed processing type list according to a service type of a service flow and a data path type template, where the data path type template includes all processing function types and a selection instruction corresponding to each processing function type, the to-be-confirmed processing type list includes all first processing function types, and the first processing function types are processing function types that may be needed by the service flow. The processor then filters the first processing function types according to a selection instruction corresponding to each first processing function type, and generates a processing type list, where the processing type list includes all second processing function types, and the second processing function types are processing function types, essential to the service flow, after filtering. Further, the processor selects a corresponding processing instance for each second processing function type, and sequentially selects a working policy and a working parameter for each processing instance; the processor generates a full path policy, where the path policy includes all the processing instances that the service flow sequentially flows through and a working policy and a working parameter that correspond to each processing instance; and the transmitter sends the full path policy to an instance of each function node according to a network topology, so that the instance of each function node processes the service flow according to the full path policy, thereby selecting a corresponding service flow path according to a service type corresponding to a different service flow, balancing a network load, and improving network resource utilization.

Further, the processor 30 is specifically configured to: if the selection instruction corresponding to the first processing function type is mandatory, add the first processing function type to the processing type list; or is specifically configured to: if the selection instruction corresponding to the first processing function type is optional, determine whether an activation parameter corresponding to the first processing function type meets an activation condition, and if the activation parameter corresponding to the first processing function type meets the activation condition, add the first processing function type to the processing type list.

Further, the activation parameter corresponding to the first processing function type includes one or any combination of a current network load, a user level, or service QoS (QoS) information of the service flow.

The processor 30 is specifically configured to: if the current network load corresponding to the first processing function type is greater than or less than a load threshold, add the first processing function type to the processing type list; or is specifically configured to: if the user level corresponding to the first processing function type is lower or higher than a user level threshold, add the first processing function type to the processing type list; or is specifically configured to: if the service QoS information corresponding to the first processing function type meets or does not meet a QoS requirement, add the first processing function type to the processing type list.

Further, the processor 30 is specifically configured to select the corresponding processing instance for each second processing function type according to a status of the instance of each function node in the network topology and the service QoS information of the service flow, where each second processing function type corresponds to one processing instance, and each processing instance corresponds to an instance of one function node.

Further, the processor 30 is further specifically configured to select the working policy and the working parameter for each processing instance according to the status of the instance of each function node in the network topology and preconfigured policy information, and allocate a transmission bandwidth resource and a calculation processing resource to the service flow, where each processing instance corresponds to an instance of one function node.

The processor 30 is configured to determine, before the to-be-confirmed processing type list is generated according to the service type of the service flow and the data path type template, according to the network topology and a mapping relationship between a user IP address of the service flow and a radio node, the radio node corresponding to the service flow; or configured to determine a last hop of the instances of the function nodes according to the network topology and a mapping relationship between a user IP address of the service flow and a radio node.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A control method in a communications network, the method comprising:
generating, by a centralized controller in a communications network, a to-be-confirmed processing type list according to a service type of a service flow and a data path type template, wherein the data path type template comprises all processing function types and a selection instruction corresponding to each processing function type, the to-be-confirmed processing type list comprises all first processing function types, and the first processing function types are processing function types in the data path template and are optional to the service flow;
filtering, by the centralized controller, the first processing function types according to a selection instruction corresponding to each first processing function type, and generating a processing type list, wherein the processing type list comprises all second processing function types, and the second processing function types are processing function types in the to-be-confirmed processing type list and are mandatory to the service flow, after filtering;
selecting, by the centralized controller, a corresponding processing instance for each second processing function type according to a status of an instance of each function node in a network topology and a service quality of service (QoS) information of the service flow, and sequentially selecting a working policy and a working parameter for each processing instance, wherein the instance of each function node corresponds to one processing instance, and the network topology comprises function types of the instances of all the function nodes, connection relationships between the instances of all the function nodes, and statuses of the instances of all the function nodes;
generating, by the centralized controller, a full path policy, wherein the full path policy comprises all the processing instances that the service flow sequentially flows through and the working policy and the working parameter that correspond to each processing instance; and
sending, by the centralized controller, the full path policy to an instance of each function node according to the network topology.

2. The method according to claim 1, wherein filtering, by the centralized controller, the first processing function types according to a selection instruction corresponding to each first processing function type, and generating a processing type list comprises:
corresponding to the service type of the service flow, when the selection instruction corresponding to the first processing function type is mandatory, adding, by the centralized controller, the first processing function type to the processing type list; or
corresponding to the service type of the service flow, when the selection instruction corresponding to the first processing function type is optional, determining, by the centralized controller, whether an activation parameter corresponding to the first processing function type meets an activation condition, and when the activation parameter corresponding to the first processing function type meets the activation condition, adding, by the centralized controller, the first processing function type to the processing, type list.

3. The method according to claim 2, wherein:
the activation parameter corresponding to the first processing function type comprises one or any combination of a current network load, a user level, or service QoS information of the service flow; and
determining, by the centralized controller, whether an activation parameter corresponding to the first processing function type meets an activation condition, and when the activation parameter corresponding to the first processing function type meets the activation condition, adding, by the centralized controller, the first processing function type to the processing type list comprises:
  when the current network load corresponding to the first processing function type is greater than or less than a load threshold, adding, by the centralized controller, the first processing function type to the processing type list, or
  when the user level corresponding to the first processing function type is lower or higher than a user level threshold, adding, by the centralized controller, the first processing function type to the processing type list, or
  when the service QoS information of the service flow corresponding to the first processing function type meets or does not meet a QoS requirement, adding, by the centralized controller, the first processing function type to the processing type list.

4. The method according to claim 1, wherein selecting, by the centralized controller, a corresponding processing instance for each second processing function type comprises:
  each second processing function type corresponds to one processing instance, and each processing instance corresponds to an instance of one function node; selecting, by the centralized controller, the corresponding processing instance for each second processing function type according to a status of the instance of each function node in the network topology and the service QoS information of the service flow.

5. The method according to claim 1, wherein sequentially selecting, by the centralized controller, a working policy and a working parameter for each processing instance comprises:
  each processing instance corresponds to an instance of one function node; selecting, by the centralized controller, the working policy and the working parameter for each processing instance according to the status of the instance of each function node in the network topology and preconfigured policy information, and allocating a transmission bandwidth resource and a calculation processing resource to the service flow.

6. The method according to claim 1, wherein before generating, by a centralized controller, a to-be-confirmed processing type list according to a service type of a service flow and a data path type template, the method further comprises:
  determining, by the centralized controller according to the network topology and a mapping relationship between a user IP address of the service flow and a radio node, the radio node corresponding to the service flow; or
  determining, by the centralized controller, a last hop of the instances of the function nodes according to the network topology and a mapping relationship between a user IP address of the service flow and a radio node.

7. A centralized controller, applied to a wireless communications network, the centralized controller comprising:
  a processor; and
  a non-transitory computer-readable storage medium coupled to the processor and storing a program for execution by the processor, the program including instructions to:
    generate a to-be-confirmed processing type list according to a service type of a service flow and a data path type template, wherein the data path type template comprises all processing function types and a selection instruction corresponding to each processing function type, the to-be-confirmed processing type list comprises all first processing function types, and the first processing function types are processing function types that may be needed by the service flow;
    filter the first processing function types according to a selection instruction corresponding to each first processing function type, and generate a processing type list, wherein the processing type list comprises all second processing function types, and the second processing function types are processing function types, essential to the service flow, after filtering;
    select a corresponding processing instance for each second processing function type according to a status of an instance of each function node in a network topology and a service quality of service (QoS) information of the service flow, and sequentially select a working policy and a working parameter for each processing instance, wherein the instance of each function node corresponds to one processing instance, and the network topology comprises function types of the instances of all the function nodes, connection relationships between the instances of all the function nodes, and statuses of the instances of all the function nodes;
    generate a full path policy, wherein the full path policy comprises all the processing instances that the service flow sequentially flows through and a working policy and a working parameter that correspond to each processing instance; and
    send the full path policy to an instance of each function node according to the network topology.

8. The centralized controller according to claim 7, wherein the program further includes instructions to:
  when the selection instruction corresponding to the first processing function type is mandatory, add the first processing function type to the processing type list; or
  when the selection instruction corresponding to the first processing function type is optional, determine whether an activation parameter corresponding to the first processing function type meets an activation condition, and when the activation parameter corresponding to the first processing function type meets the activation condition, add the first processing function type to the processing type list.

9. The centralized controller according to claim 8, wherein:
  the activation parameter corresponding to the first processing function type comprises one or any combination of a current network load, a user level, or service QoS information of the service flow; and
  the program further includes instructions to:
    when the current network load corresponding to the first processing function type is greater than or less than a load threshold, add the first processing function type to the processing type list, or
    when the user level corresponding to the first processing function type is lower or higher than a user level threshold, add the first processing function type to the processing type list, or
    when the service QoS information corresponding to the first processing function type meets or does not meet a QoS requirement, add the first processing function type to the processing type list.

10. The centralized controller according to claim 7, wherein the program further includes instructions to select the corresponding processing instance for each second processing function type according to a status of the instance of each function node in the network topology and the service QoS information of the service flow, wherein each second processing function type corresponds to one processing instance, and each processing instance corresponds to an instance of one function node.

11. The centralized controller according to claim 7, wherein the program further includes instructions to:
- select the working policy and the working parameter for each processing instance according to the status of the instance of each function node in the network topology and preconfigured policy information; and
- allocate a transmission bandwidth resource and a calculation processing resource to the service flow, wherein each processing instance corresponds to an instance of one function node.

12. The centralized controller according to claim 7, the program further includes instructions to:
- determine, before the to-be-confirmed processing type list is generated according to the service type of the service flow and the data path type template, according to the network topology and a mapping relationship between a user IP address of the service flow and a radio node, the radio node corresponding to the service flow; or
- determine a last hop of the instances of the function nodes according to the network topology and a mapping relationship between a user IP address of the service flow and a radio node.

* * * * *